United States Patent
Davis

[11] 3,770,001
[45] Nov. 6, 1973

[54] VALVE CONSTRUCTION
[75] Inventor: Gordon Jerry Davis, Newton, Iowa
[73] Assignee: The Maytag Company, Newton, Iowa
[22] Filed: July 6, 1971
[21] Appl. No.: 159,824

[52] U.S. Cl........ 137/217, 137/533.15, 137/533.11, 137/519.5, 137/202, 251/333
[51] Int. Cl............................................. F16k 45/00
[58] Field of Search.................... 137/217, 218, 532, 137/202, 533, 533.11, 533.13, 533.15, 533.19, 516.25, 516.27, 516.29, 519, 519.5, 539; 251/333, 334, 26–30, 56, 57

[56] References Cited
UNITED STATES PATENTS

| 622,720 | 4/1899 | Sieben | 137/533.13 X |
| 1,882,314 | 10/1932 | Burt | 137/519.5 X |
| 3,012,623 | 12/1961 | Powers | 137/519.5 X |
| 3,180,352 | 4/1965 | Kersten et al. | 137/218 |
| 2,655,171 | 10/1953 | Cantor | 137/218 |
| 2,850,034 | 9/1958 | Svabek et al. | 137/218 |
| 1,164,342 | 12/1915 | Gase | 137/533.15 |
| 2,904,794 | 9/1959 | Goldtrap | 4/57 R |
| 3,041,629 | 7/1962 | Pratt | 4/28 |

FOREIGN PATENTS OR APPLICATIONS

| 1,502,672 | 10/1967 | France | 137/539 |

Primary Examiner—Henry T. Klinksiek
Attorney—William G. Landwier et al.

[57] ABSTRACT

A valve construction including a thin pliable primary valve seat that will cooperate with a movable valve member to effect a seal responsive to extremely low urging forces and further including a secondary or backup seat juxtaposed to the primary seat and engageable thereby responsive to higher urging forces to maintain the seal at much higher back pressures.

13 Claims, 7 Drawing Figures

INVENTOR
GORDON JERRY DAVIS
BY
William G. Landwier
Richard L. Ward
AGENTS

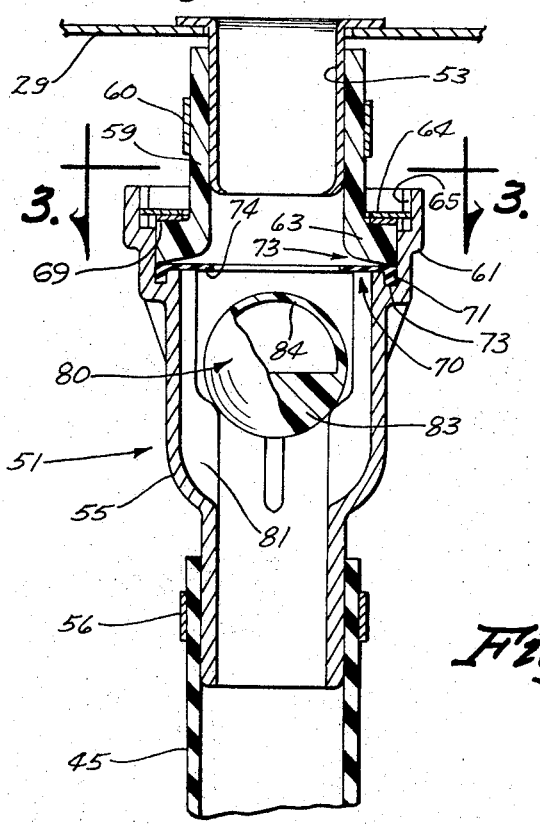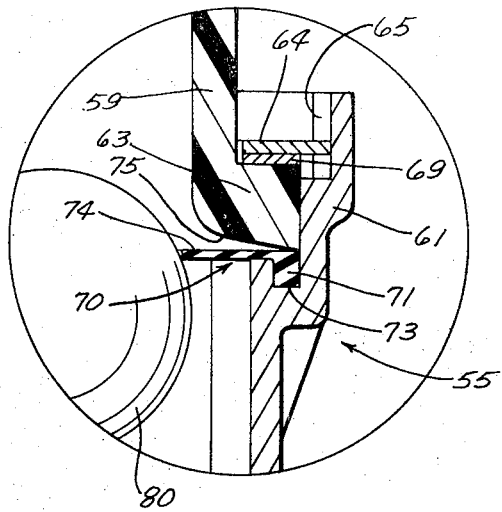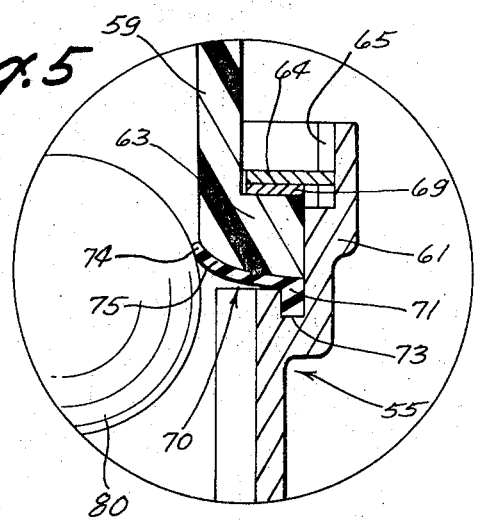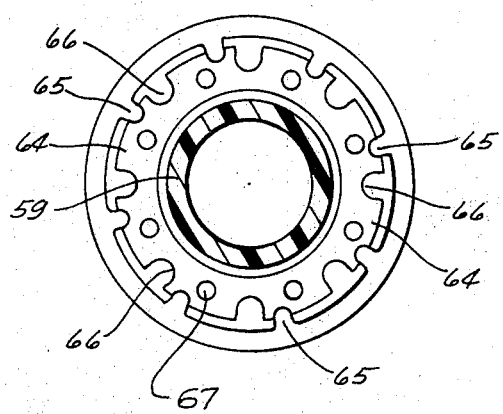

PATENTED NOV 6 1973 3,770,001

INVENTOR
GORDON JERRY DAVIS
BY
William G. Landwier
Richard L. Ward
AGENTS

VALVE CONSTRUCTION

SUMMARY OF THE INVENTION

This invention relates to valves and more particularly to a self-actuating valve operable at low back pressures and at high back pressures to prevent fluid flow in one direction.

A self-actuating valve is particularly advantageous in a washing apparatus for preventing backflow of used washing liquid from the pump and drain hose into the washing container following completion of a liquid pump-out portion of the cycle. It is important to prevent return of residual liquid from the drain conduit upon termination of pumping for avoiding mixing of the residual liquid with the washing liquid for the succeeding washing cycle.

It is therefore an object of the instant invention to provide an improved valve construction operable over a wide range of back pressures for preventing fluid flow in one direction.

It is a further object of the instant invention to provide an improved self-actuating valve having primary and secondary valve seats for achieving a low pressure seal and a high pressure seal to prevent backflow under relatively low back pressures and relatively high back pressures.

It is a further object of the instant invention to provide an improved self-actuating valve having means for effecting a seal responsive to relatively low urging forces for preventing low pressure backflow and further operable responsive to high fluid back pressures for preventing high pressure backflow of fluids.

It is still a further object of the instant invention to provide a check valve including a vertically movable buoyant valve member engageable with a highly resilient seal member for preventing low pressure backflow that is in turn engageable with a backup seat for maintaining a seal against high pressure backflow.

These objects are achieved in a valve construction having a first highly resilient valve seat sealingly engageable with a mating member responsive to a low urging force for preventing low pressure fluid flow in one direction and further including a second backup valve seat of relatively lower resiliency juxtaposed to said first valve seat for sealing engagement by said first valve seat responsive to relatively higher fluid pressure for preventing backflow in the one direction under the higher fluid pressure.

Operation of the device and further objects and advantages thereof will become evident as the description proceeds and from an examination of the accompanying three pages of drawings.

DESCRIPTION OF THE DRAWINGS

The drawings illustrate a preferred embodiment of the invention with similar numerals referring to similar parts throughout the several views wherein:

FIG. 2 is a longitudinal sectional view of the valve construction of the instant invention as taken along lines 2—2 of FIG.1;

FIG. 3 is a transverse sectional view of the inlet portion of the valve construction of the instant invention as taken the instant lines 3—3 of FIG. 2;

FIG. 4 is an enlarged fragmentary sectional view of the low pressure sealing condition of the valve construction of theinstant invention;

FIG. 5 is a fragmentary sectional view similar to FIG. 4 showing a high pressure sealing condition of the valve construction of the instant invention;

DESCRIPTION OF THE PREFERRED EMBODIMENT

Figure 1:
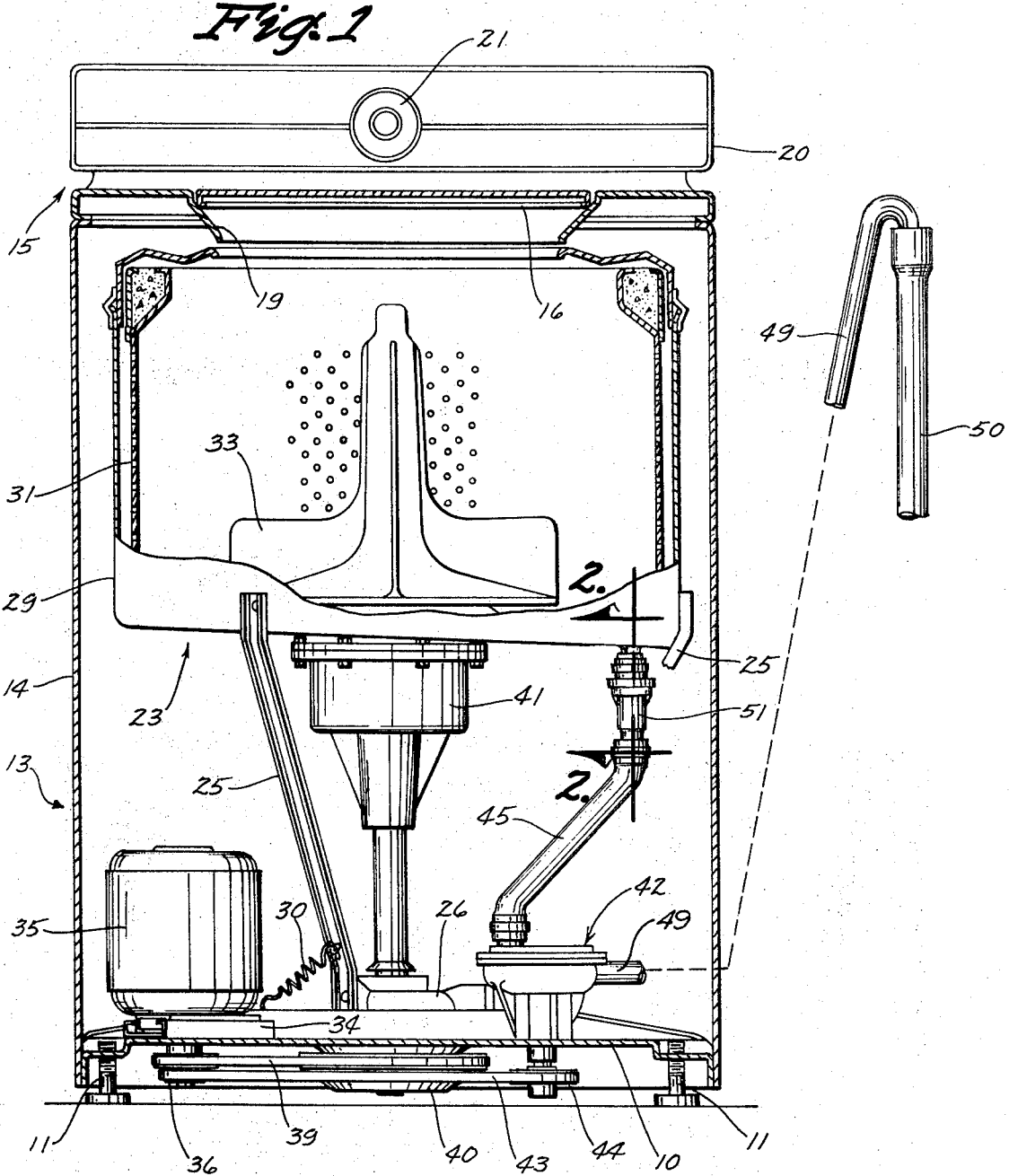
FIG. 1 is an overall view of an automatic washing machine with various portions broken away to show a system in which a valve construction of the instant invention is particularly useful.

Referring now to FIG. 1, there is shown an automatic washing machine including a base frame 10 supported on a plurality of adjustable legs 11 and mounting a cabinet 13 comprising sidewall portions 14 and a top cover portion 15. The top cover portion 15 includes a hinged door panel 16 normally covering a recessed loading opening 19 and further includes an upwardly extending housing 20 for accommodating various control members such as programming means actuatable by the dial 21.

Mounted within the cabinet 13 is a tub assembly 23 nutationally supported on the base frame 10 by an inverted tripod arrangement including tub braces 25 which are connected at the lower end to a support member 26 positioned on the base frame 10. The tub braces 25 are connected at their upper ends to a generally imperforate outer liquid container or tub 29. The tub braces 25 are also resiliently connected to the base frame 10 by means of centering springs 30 which resist rotation of the support member 26 relative to the base frame 11 but permit nutational movement relative to the base frame 11.

Revolubly mounted in the imperforate outer tub 29 is a perforate clothes basket or inner tub 31 in which is positioned an oscillatable agitator 33 for effecting movement of fabrics and washing liquid within the tub assembly 23. The imperforate outer tub 29 and the perforate inner tub 31 are substantially aligned with the loading opening 19 in the top cover 15 for permitting the operator to place fabrics within the inner tub 31 and to remove them upon completion of the cycle.

The base frame 10 also supports, through a motor mount 34, a reversible drive motor 35 operable in a bi-directional drive system for selectively effecting oscillation of the agitator 33 or centrifugal rotation of the inner tub 31. The drive system for selectively effecting operation of the agitator 33 and rotation of the inner tub 31 includes a double groove pulley 36 fixed to the shaft of motor 35 and drivingly engaged with a main drive belt 39 which in turn is drivingly engaged with the main drive pulley 40. The main drive pulley 40 is drivingly connected to either the agitator 33 through a drive shaft (not shown) and the gearing of a transmission 41 or to the inner tub 31 through the housing of the transmission 41 and a clutch (not shown).

Operation of the motor 35 in a first direction effects rotation of the main drive pulley 40 for effecting oscillation of the agitator 33 through the drive shaft (not shown) and transmission gearing. Operation of the motor 35 in the opposite driection effects rotation of the drive pulley 40 and the transmission 41 through the clutch (not shown) for rotating the inner tub 31 to effect centrifugal extraction of liquid from fabrics within the inner tub 31.

The washing machine is provided with controls for programming the machine through a sequence of operations including energization of the motor 35 for operation in a first direction to effect a washing and/or rinsing function followed by energization of the motor 35 in a second direction to effect a liquid extraction function.

The construction and mounting of the tub assembly 23 and the operation of the inner tub 31 and agitator 33 are more clearly and specifically shown in the following patents, each of which is assigned to the assignee of the instant invention: Scott et al. U.S. Pat. No. 2,854,297; Smith et al. U.S. Pat. No. 2,926,136; Burkland U.S. Reissue Pat. No. 25,157; and Goodlaxson U.S. Pat. No. 3,013,645.

The base frame 10 also supports a pumping means 42 that is driven by the bidirectional motor 35 through the motor-mounted pulley 36, the pump drive belt 43 and the pump-mounted pulley 44. The pump 42 communicates with the outer tub 29 through a conduit 45 and is operable for carrying liquids from the outer tub 29 and pumping them toward an external drain through a drain hose 49 and standpipe 50 when the motor 35 is operated in the direction for effecting centrifugal rotation of the inner tub 31. Since the pump 42 is drivingly connected to the bidirectional motor 35 and is operable in the first and second directions with the motor 35, the pump 42 will tend to pump liquids toward the outer tub 29 through the conduit 45 when the motor 35 is operating in the direction for effecting agitation of the fabrics during the washing portion of the cycle.

In installations of the washing apparatus wherein a relatively long elevated drain hose is provided or wherein a standpipe drain is utilized as in FIG. 1, the drain hose 49 is capable of retaining a significant quantity of liquid at the termination of the pump-out or extraction period. This retained liquid, in the absence of a check valve in the line between the pump 42 and the outer tub 29, tends to return toward the outer tub 29 as the liquid seeks a stabilized level. This backflow of liquid toward the outer tub is considered by some as undesirable since there may be intermixing of the residual used washing liquid with the fresh washing liquid for the succeeding cycle and it is therefore preferred that the backflow into the outer tub be prevented.

As will be shown in greater detail hereinbelow, a check valve assembly 51 embodying the instant invention is operable for permitting relatively free liquid flow from the outer tub 29 to the pump 42 and thus to the drain during pump out while preventing backflow of used washing liquid into the outer tub 29 upon termination of the pump out and during the succeeding washing operation.

Referring to FIG. 2, there is shown a longitudinal sectional view of the check valve assembly 51 embodying the instant invention as useful in preventing the backflow of washing liquid into the washing container of a fabric washing apparatus for example. The check valve assembly 51 is connected between the outlet 53 of the outer tub 29 and the fluid conduit 45 leading to the pump 42. The check valve assembly 51 includes a housing 55 formed of a relatively rigid plastic to which the fluid conduit 45 is connected at the lower end by a clamp 56. The check valve assembly 51 further includes an upper tubular member 59 formed of a resilient elastomer material and retained on the tub outlet 53 by a clamp 60. An enlarged portion 61 of the housing 55 internally receives a flange portion 63 of the tubular member 59.

The mating portions of the housing and tubular member are securely held together by a retaining ring 64. The enlarged portion 61 of the housing includes a plurality of radially inwardly extending ribs 65, as best shown in FIG. 3, which are aligned with grooves 66 in the retaining ring 64 for initial assembly. The retaining ring 64 is then rotated, such as with a tool engageable with holes 67, to cut into the ribs 65 to securely connect the housing 55 to the tubular member 59. A washer 69 is disposed between the retaining ring 64 and the flange portion 63 of the tubular member 59.

The check valve assembly 51 further includes a thin pliable resilient seat member 70 disposed between the flange portion 63 of the tubular member 59 and the housing 55. The seat member 70 includes an outer annular ring 71 mating with a groove 73 in the housing 55 and is retained in position by the clamping action between the flange portion 63 and the offset in the housing 55. The seat member 70 includes a thin annular lip 74 extending into the housing passageway and defining a sufficiently large central opening to permit relatively free flow of liquid in a downward direction through the check valve assembly 51.

A lower surface 75 of the radially outwardly extending flange portion 63 of the tubular member 59 defines a secondary seat or backup seat for engagement by the inwardly extending thin pliable lip 74 of the primary seat member 70 to insure a high pressure seal against backflow of fluid in the upward direction.

The check valve assembly 51 includes a spherical valve member 80 loosely retained in the housing 55 and, in the absence of an upward pressure, supported on a plurality of ribs 81 formed internally to the housing 55. The movable valve member 80 may be formed of a styrene copolymer or similar lightweight material and includes a generally solid lower portion 83 and a hollow upper portion 84 molded as separate halves. The two halves may be solvent welded to form a buoyant, unbalanced, ball-like valve member 80 movable within the housing 55 in a generally predetermined orientation so that a surface free of flash lines is always oriented for engagement with the lip 74 of the resilient seat member 70.

As previously indicated, the ball valve member 80 is buoyant and upon a rise of liquid in the conduit 45 leading from the pump 42 to the tub outlet 53, such as occurring at termination of a pump-out operation, will rise to engage the lid 74 of the primary valve seat 70 as shown in FIG. 4. This seal is effected by relatively low pressures such as are present with a rising liquid level acting on the valve member 80. The seal is sufficient to prevent passage of liquid beyond the seal member 70 so that used washing liquid is not returned into the outer tub 29 upon cessation of the pumping action at termination of the extraction operation.

In a construction as shown in FIG. 1 wherein operation of the pump 42 in an opposite direction tends to pump liquid toward the outer tub 29, it is important that a high pressure seal be effected to prevent the recirculation of liquid into the tub 29 under the force of the pump 42. Such a high pressure seal is effected in FIG. 5 wherein the higher pressure of the liquid in the backflow direction forces the movable valve ball member 80 further upwardly in the check valve so that the primary valve seat 70 flexes into engagement with the secondary valve seat comprising the lower surface 75 of the flange portion 63 so as to back up the primary seat for effecting a relatively high pressure fluid seal.

Figure 6:
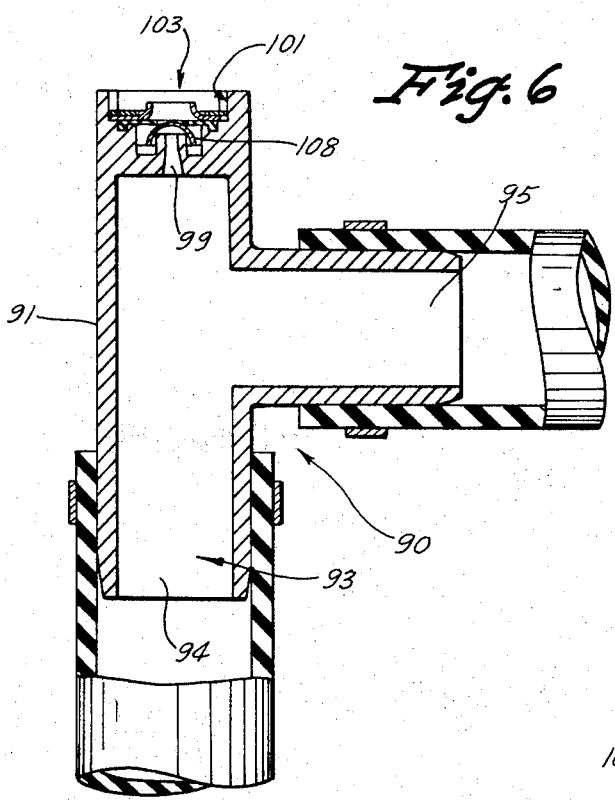
FIG. 6 is a sectional view of a vacuum breaker assembly showing an alternate embodiment of the instant invention.
Figure 7:
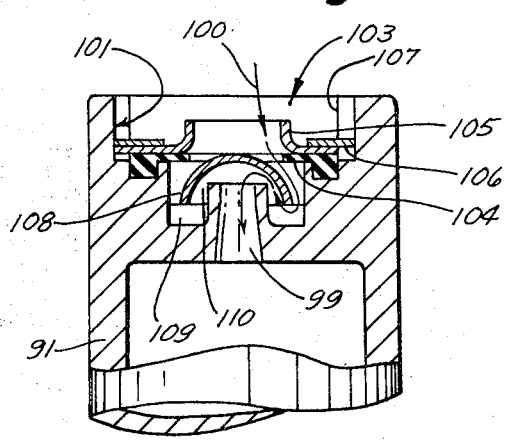
FIG. 7 is an enlarged fragmentary sectional view of the device of FIG. 6.

In a specific construction for a check valve embodying the instant invention as in FIG. 2 the primary valve seat 70 is formed of an ethylene propylene terpolymer having a durometer of approximately 40 Shore A and having a lip portion approximately 0.020 inch in thickness and defining a opening approximately Referring to FIGS. 6 and 7, there is shown a vacuum breaker assembly 90 incorporating an alternate embodiment of the instant invention. The vacuum breaker assembly 90 is useful with an automatic washing machine to provide an air break or air gap in the drain line in accordance with certain plumbing ordinances.

In the vacuum breaker assembly 90, a housing 91 defines a liquid conduit 93 including an inlet 94 and an outlet 95 connectable into the drain hose 49 of FIG. 1, for example. The housing 91 further defines an air passage including an orifice 99 for venting the liquid conduit to the atmosphere along a path indicated by the arrows 100 in FIG. 7.

As best shown in FIG. 7, the housing 92 defines an annular recessed portion 101 to receive a valve assembly 103 including a first highly resilient pliable primary valve seat 104 similar to the valve seat 70 shown in the check valve of FIG. 2. A secondary valve seat 105 formed of a substantially rigid material and otherwise similar in function to the secondary valve seat 75 of the check valve of FIG. 2 is positioned next to the primary valve seat 104. A retaining ring 106, rotatable into a shearing relationship with ribs 107 extending inwardly from the housing 91, securely clamps the primary and secondary seat members 104, 105 into the position as best shown in FIG. 7.

A movable, generally hemispherical, valve member 108 is loosely retained in the space between the primary valve seat 104 and the end of the orifice 99 that communicates with the liquid conduit 93. A plurality of supporting rib members 109 around the orifice 99 position the movable valve member 108 to insure an open air passage from the atmosphere into the liquid conduit 93.

Responsive to a pumping of liquid into the inlet 94 of the vacuum breaker assembly a small quantity of liquid is directed through the orifice 99 and against the inside surface of the hemispherical valve member 108 causing it to move into a sealing relationship with the primary seal 104 for preventing liquid leakage through the air vent passage. In this embodiment, the low urging force of the small quantity of liquid is sufficient to achieve a seal against relatively low pressure flow through the liquid conduit. An equalization of pressure between the liquid conduit and the cavity 110 will maintain the seal. Upon an increase in liquid pressures within the liquid conduit 93 the higher pressure or urging force on the inside of the hemispherical valve member 108 will cause the primary valve seal 104 to deflect into engagement with the secondary valve seat 105 to insure a continued seal against high pressure liquid flow through the air vent in the direction to atmosphere.

It is therefore seen that the unique construction of the valve as shown hereinabove provides advantageous features useful in achieving an effective fluid seal with a low actuating force. In one embodiment, the invention is embodied in a check valve for preventing backflow of fluid from the pump and drain conduit into the washing tub. The construction provides an extremely sensitive self-actuating check valve responsive to a rise of fluid into the conduit leading to the tub outlet, for example, for closing off the outlet to prevent the backflow of washing fluid into the outer tub. Furthermore, the check valve is operable for effecting a high pressure seal to prevent flow of fluid during operation of the pump.

In the drawings and specification, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient without departing from the spirit or scope of this invention as defined in the following claims.

I claim:

1. A valve comprising: housing means defining a fluid passage; a movable valve member disposed within said housing means and having a first position within said fluid passage for permitting relatively free fluid flow in a first direction; a resilient seal means including a pliable lip portion extending into said fluid passage operatively disposed between and effectively fixed to one of said valve member and said housing means, said movable valve member being responsive to a relatively low urging force in a second direction for movement to a second position within said fluid passage for effecting a low pressure seal of said seal means lip portion with the other of said valve member and said housing means to prevent fluid flow through said passage in said second direction; and a resiliently deformable seal backup means juxtaposed to said seal means, said pliable lip portion being responsive to the urging of said valve member at a relatively higher urging force in said second direction for deflecting into engagement with said seal backup means, said seal means and said seal backup means being cooperatively deformable for maintaining said seal against relatively higher pressure in said second direction.

2. A valve as defined in claim 1 wherein said fluid passage defines an air vent communicating with a liquid conduit defined by said housing means and having an inlet and an outlet separate from said fluid passage whereby said valve is operable as a vacuum breaker device.

3. A valve as defined in claim 1 wherein said fluid passage conducts liquid through the passage in one direction and wherein said valve member is responsive to a liquid back pressure in said fluid passage for moving to the seal position for preventing flow of liquid through said passage whereby said valve is operable as a check valve.

4. A valve comprising: housing means defining a fluid passage; a resilient and pliable valve seat effectively fixed to said housing means and including a lip portion extending into said fluid passage; a resiliently deformable valve seat backup means effectively fixed to said housing means and juxtaposed above said valve seat within said fluid passage; and a movable valve member having a first lower position within said housing means permitting relatively free fluid flow in a downward direction and movable upwardly responsive to a low urging force to a second position of sealing engagement with said valve seat lip portion for preventing low pressure fluid flow through said fluid passage in an upward backflow direction, said valve seat being responsive to a higher urging force on said valve member in said second direction for deflecting into engagement with said valve seat backup means, said valve seat and said valve seat backup means being cooperatively deformable to maintain said seal for preventing relatively higher pressure fluid flow through said fluid passage in said backflow direction.

5. A check valve as defined in claim 4 wherein said valve member is loosely retained within said housing means for movement to said first lower position under the forces of gravity and wherein said housing means defines support means for locating said valve member in said first lower position to permit said relatively free fluid flow in said first direction.

6. A check valve as defined in claim 4 wherein said valve member is buoyant and includes means to retain the valve member in a predetermined orientation within said housing means for sealing engagement with said valve seat.

7. A check valve as defined in claim 5 wherein said valve seat backup means is formed of an elastomeric material integrally with an axially extending tubular portion comprising means for connecting said housing means to a fluid conduit.

8. A check valve comprising: housing means defining a generally vertical liquid passage; a resilient valve seat including a thin pliable lip portion extending into said passage and effectively fixed to said housing means; a resiliently deformable valve seat backup means of relatively lower resiliency and juxtaposed above said valve seat within said passage and effectively fixed to said housing means; a vertically movable buoyant valve member having a first position within said housing means spaced below said valve seat for permitting relatively free liquid flow in a first downward direction and buoyantly movable upwardly into sealing engagement with said valve seat lip portion responsive to a relatively low pressure in a second upward direction upon a liquid rise in said passage to prevent low pressure liquid flow through said passage in said second upward direction, said valve seat being responsive to the urging of said valve member at a relatively higher pressure in said second upward direction for deflecting into engagement with said valve seat backup means, said valve seat and said valve seat backup means being cooperatively deformable to effect a relatively higher pressure seal for preventing higher pressure flow through said passage in said second direction.

9. A check valve as defined in claim 8 wherein said valve seat is in the form of a thin pliable member having an annular seal lip extending into said passage for sealing engagement by said valve member under a relatively low buoyant force.

10. A check valve as defined in claim 8 wherein said valve member is in the form of a buoyant sphere having a weighted lower portion to maintain said valve member in a predetermined orientation within said passage.

11. A check valve as defined in claim 8 and further including inlet and outlet means for connecting said check valve into a liquid conduit.

12. A check valve as defined in claim 8 wherein said valve seat includes an enlarged annular ring disposed radially outwardly from said passage and effectively clamped between a portion of said housing means and said valve seat backup means for axially and radially retaining said valve seat for sealing engagement by said movable valve member.

13. A valve comprising: housing means defining a liquid conduit including an inlet and an outlet and further defining an air passage communicating with said conduit; a resilient and flexible annular valve seat including a pliable lip portion effectively disposed within said air passage; a resiliently deformable valve seat backup means juxtaposed above said valve seat within said air passage; and a movable valve member having a first position within said housing means permitting relatively free airflow in a first direction into said conduit and movable responsive to a low urging force to a second position of sealing engagement with said valve seat lip portion for preventing fluid flow from said conduit through said air vent in a second direction, said valve seat being responsive to a higher urging force on said valve member in said second direction for deflecting into engagement with said valve seat backup means, said valve seat and said valve seat backup means being cooperatively deformable to maintain said seal for preventing liquid flow through said air passage in said second direction under a higher pressure.

* * * * *

UNITED STATES PATENT OFFICE
CERTIFICATE OF CORRECTION

Patent No. 3,770,001                    Dated November 6, 1973

Inventor(s) Gordon Jerry Davis

It is certified that error appears in the above-identified patent and that said Letters Patent are hereby corrected as shown below:

Column 1, line 68, "the instant" should read -- along --.

Column 2, line 66, "driection" should read -- direction --.

Column 5, line 11, after "approximately" insert -- 7/8 inch diameter. The secondary valve seat defined by surface 75 is formed of similar material having a durometer of approximately 80 Shore A and a flange thickness of approximately 5/16 inch. In this specific example, the movable valve member is molded of a styrene acrylonitrile copolymer in approximately a one inch spherical ball. The movable valve member will sealingly engage the primary seat at low pressures resulting from only the buoyancy force of water acting on the movable valve member when approximately half submerged in the rising liquid. High pressures for this specific embodiment are in the general area of 5 psi and result from the reverse operation of the pump as is present during the washing portion of the cycle of operations.

This valve construction is shown in a copending application

UNITED STATES PATENT OFFICE
CERTIFICATE OF CORRECTION

Patent No. 3,770,001  Dated November 6, 1973

Inventor(s) Gordon Jerry Davis                    Page - 2

It is certified that error appears in the above-identified patent and that said Letters Patent are hereby corrected as shown below:

entitle LIQUID CONTROL SYSTEM FOR A WASHING MACHINE, Serial No. 159,825 filed July 6, 1971 by Thomas R. Smith and assigned to the assignee of this invention, now Patent No. 3,691,797 issued September 19, 1972. - . Column 5, line 25, "92" should read -- 91 - .

Signed and sealed this 29th day of October 1974.

(SEAL)
Attest:

McCOY M. GIBSON JR.          C. MARSHALL DANN
Attesting Officer            Commissioner of Patents